(12) United States Patent
Makabe et al.

(10) Patent No.: US 7,395,512 B2
(45) Date of Patent: Jul. 1, 2008

(54) CHARACTER INPUT SYSTEM AND COMMUNICATION TERMINAL

(75) Inventors: Koichi Makabe, Tokyo (JP); Junya Mizuno, Tokyo (JP); Ayumi Kawahara, Tokorozawa (JP)

(73) Assignees: eValley Inc., Tokyo (JP); e for us Inc., Saitama-ken (JP)

( * ) Notice: Subject to any disclaimer, the term of this patent is extended or adjusted under 35 U.S.C. 154(b) by 595 days.

(21) Appl. No.: 10/178,514

(22) Filed: Jun. 25, 2002

(65) Prior Publication Data

US 2003/0014449 A1  Jan. 16, 2003

(30) Foreign Application Priority Data

Jun. 29, 2001  (JP)  ............................. 2001-198733

(51) Int. Cl.
*G06F 3/048* (2006.01)
(52) U.S. Cl. ..................... 715/816; 715/810; 715/825
(58) Field of Classification Search ................ 715/816, 715/810, 825, 532–535
See application file for complete search history.

(56) References Cited

U.S. PATENT DOCUMENTS

| | | | |
|---|---|---|---|
| 4,866,759 A | 9/1989 | Riskin | |
| 5,200,988 A | 4/1993 | Riskin | |
| 5,786,776 A | 7/1998 | Kisaichi et al. | |
| 5,797,098 A | 8/1998 | Schroeder et al. | |
| 5,818,437 A | 10/1998 | Grover et al. | |
| 5,911,485 A | 6/1999 | Rossmann | |
| 5,977,969 A * | 11/1999 | DiAngelo | .................... 715/780 |
| 6,005,495 A | 12/1999 | Connolly et al. | |
| 6,011,554 A | 1/2000 | King et al. | |
| 6,125,347 A * | 9/2000 | Cote et al. | ................... 704/275 |
| 6,219,731 B1 * | 4/2001 | Gutowitz | ...................... 710/67 |
| 6,223,059 B1 * | 4/2001 | Haestrup | .................... 455/566 |
| 6,338,082 B1 * | 1/2002 | Schneider | .................... 709/203 |
| 6,708,214 B1 * | 3/2004 | La Fleur | ..................... 709/226 |
| 6,944,593 B2 * | 9/2005 | Kuzunuki et al. | ......... 704/270.1 |
| 7,155,683 B1 * | 12/2006 | Williams | ..................... 715/816 |

(Continued)

FOREIGN PATENT DOCUMENTS

JP  10-49540  2/1998

(Continued)

*Primary Examiner*—Weilun Lo
*Assistant Examiner*—Sara M Hanne
(74) *Attorney, Agent, or Firm*—Finnegan, Henderson, Farabow, Garrett & Dunner, L.L.P.

(57) ABSTRACT

An ambiguous key character input method is adopted, enabling appropriate character input without enlarging or complicating the structure of a portable terminal. In a mobile telephone having a keypad where a plurality of characters are respectively allocated to input keys according to number keys from 0 to 9, like a telephone keypad, am ambiguous key input method is adopted where a user respectively presses keys containing each character of a character string or word they want to input one at a time. At the mobile telephone, a disambiguation server network connected using a wired network or a wireless network returns a character string or selection list postulated by a user intending input from a series of keys received from the portable terminal to the portable terminal, and by selecting a character string or word the user wants to input from the character string selection list the character string or word is efficiently input.

17 Claims, 11 Drawing Sheets

U.S. PATENT DOCUMENTS

| | | | |
|---|---|---|---|
| 2002/0054135 A1* | 5/2002 | Noguchi et al. | 345/788 |
| 2002/0065910 A1* | 5/2002 | Dutta | 709/224 |
| 2002/0126097 A1* | 9/2002 | Savolainen | 345/168 |
| 2002/0173946 A1* | 11/2002 | Christy | 704/2 |
| 2003/0001816 A1* | 1/2003 | Badarneh | 345/156 |

FOREIGN PATENT DOCUMENTS

| | | |
|---|---|---|
| JP | 10-83241 | 3/1998 |
| JP | 10-207908 | 8/1998 |
| JP | 2000-353044 | 12/2000 |
| JP | 2000-353175 | 12/2000 |

* cited by examiner

FIG. 4

| key information | character string | usage frequency | |
|---|---|---|---|
| 1 | あ | | Japanese database |
| | い | | |
| | う | | |
| ⋮ | | | |
| ⋮ | | | |
| 733 | RED | | English database |
| | SEE | | |
| | REF | | |
| ⋮ | | | |
| 1257 | | | |
| 92466 | YAHOO | | URL database |
| | WAGON | | |
| | ZAINN | | |
| ⋮ | | | |

| 733 | RED |
| | SEE |
| | REF |
| | ⋮ |

(b)

| 12 | あか (aka) |
| | 空き (aki) |
| | ⋮ |
| | あか (aka) |
| | アカ (aka) |
| | 赤 (aka) |
| | 垢 (aka) |
| | ⋮ |

CHARACTER INPUT SYSTEM AND COMMUNICATION TERMINAL

BACKGROUND OF THE INVENTION

1. Technical Field

The present invention relates to a communication terminal of a mobile telephone or the like provided with number keys from 0 to 9 respectively allocated to a plurality of characters, to a character input system that enables efficient input of characters, and to a communication terminal used in a character input system.

2. Related Art

Conventionally, the most common character input method for portable terminal devices such as mobile telephones is the so-called multi-tap method. With the multi-tap method, a number of key operations are required to input a single character.

With a mobile telephone or the like, alphabetic characters are divided up into groups and collected together in groups of three or four characters in alphabetic order, and each group is assigned to a key. For example, the letters A, B and C are allocated to the number key 2, the letters D, E and F are allocated to the number key 3, and so on, as shown in FIG. 2. With mobile phones that are used throughout the world, different character groups may also be allocated to these keys.

As is well known, with character input in the multi-tap method, it is normally necessary to perform more than one key operation to input a single character. For example, to input the word "CAFE", first of all the number 2 key is pressed three times to input the letter "C", then the number 2 key is pressed once to input the letter "A", the number 3 key is pressed three times to input the letter "F", and finally the number 3 key is pressed twice to input the letter "E". Therefore, when inputting the word "CAFE", a total of nine key operations are required, namely the sequence of pressing the number keys "222,2,333,33". With the multi-tap method, they are five more operations than performing the same input using a personal computer keyboard. This type of multi-tap method character input places a large burden on the user, and ambiguous key input methods have been proposed to improve this situation.

The basic concepts for determining a correct input character sequence or word for an ambiguous key input are summarized in the article "Probabilistic Character Disambiguation for Reduced Keyboards Using Small Text Sample" published in 1992 by the Journal of the International Society for Augmentative and Alternative Communication, by John L. Arnott and Muhammed Y. Javad (hereinafter referred to as the "Arnott article"). The Arnott Article points out that the majority of disambiguation methods use already known statistics for character strings or words of the relevant language to resolve ambiguity in a character string or word of a given context. Specifically, current disambiguation systems perform statistical analysis of a user's ambiguous key input and determine an appropriate interpretation for the ambiguous key input.

A disambiguation system called T9.RTM is also being developed by Tegic Communications, Inc.). This system checks a user's ambiguous key input against a language database, and is disclosed in U.S. Pat. No. 5,818,437. In U.S. Pat. No. 6,223,059, Nokia Mobile Phone Limited has proposed a mobile device containing a predictive editor function to further improve the input efficiency of a mobile telephone type keypad.

FIG. 12 is a drawing showing the system configuration of a mobile telephone provided with a disambiguation system. This system is comprised of a central processing unit (CPU) 200, and peripheral devices such as a memory 201, keypad 202, display 203, speaker and microphone 204, and transceiver circuit 205. The CPU 200 reads data from the memory 201 and executes instructions. The instructions are generated by the following software programs: operating system 206, browser or e-mail program 207, another application program 208, and disambiguation software 209. A character string database 210 also resides in the memory 201. With a mobile telephone provided with this type of disambiguation system, it is possible for a user to input character strings or words through ambiguous key input. The disambiguation software 209 checks whether a character string or word that can be constructed from an inputted ambiguous character string exists in the database 210. A character string database built-into the mobile telephone is difficult to update, but the character string database is normally a word database, and requirements for updating data are not particularly stringent. However, it is not appropriate to build in a character string database for data that is added or updated every day, such as domain names.

The disambiguation systems proposed up to now, however, have all been integrated into a portable terminal device. At the present time, disambiguation systems are not being incorporated into the majority of portable terminal devices available on the market, and with these majority of portable terminal devices the only usable input method is the multi-tap method. Also, in the case where a disambiguation system is incorporated into a portable terminal device, it is not easy to update the character string database within the device. For example, in cases where data update is carried out daily, such as domain names, database updating is difficult

SUMMARY OF THE INVENTION

The present invention has been conceived in view of the above described situation with regards to character input for a communications terminal, and an object of the present invention is to provide a character input system that enables appropriate character input without enlarging or complicating the structure of the communications terminal while adopting an ambiguous key input character input procedure, and is capable of handling cases where it is necessary to update character strings or words in a character database on a daily basis in a comparatively simple manner. Another object of the present invention is to provide a communication terminal that can be applied to the above described character input system.

A character input system of a first aspect of the present invention performs communication between a communication terminal and a disambiguation server via a network, and transmits and specifies character strings or words from the disambiguation server to the communication terminal in accordance with an operated key sequence, the communication terminal comprising number keys from 0 to 9 respectively allocated to a plurality of characters, display means for displaying information, and display control means for displaying a character string or word transmitted from the disambiguation server on the display means, and the disambiguation server comprising a character string database storing candidate characters strings or candidate words corresponding to key information strings from the number keys, and means for searching the character string database based on a key information string arriving via the network, and acquiring and returning candidate character strings or candidate words to the communication terminal.

With another aspect of the character input system of the present invention, the communication terminal is provided with first transmission means for transmitting key information corresponding to every operation of a number key to the disambiguation server, and second transmission means for receiving indication that desired key information string has been input and transmitting a key information string corresponding to number keys operated up until that indication is received, to the disambiguation server.

With a character input system of a third aspect of the present invention, the disambiguation server is provided with storage means for temporarily storing key information strings arriving via the network, and means for acquiring and returning candidate character strings or candidate words to the communication terminal by searching the character string database and acquiring candidate character strings or candidate words for compilation into a list to return.

According to a character input system of a fourth aspect of the present invention, a plurality of application programs are provided in the communication terminal, and the character string database is constructed to be capable of partitioning a search range in response to processing contents of the plurality of application programs, while the means for returning information to the communication terminal searches the character string database in a search range partitioned according to the processing contents of the application program being executed in the communication terminal.

According to a character input system of a fifth embodiment of the present invention, the display control means, instead of executing display of a character string or word that has been transmitted from the disambiguation server on the display means in response to a fixed operation in the communication terminal, executes a multi-tap method to sequentially display one character among a plurality of characters allocated to a number key in response to a number of times that number key is operated on the display means.

According to a character input system of a sixth embodiment of the present invention, candidate character strings or words, together with usage frequency information, are stored in the character string database in response to key information strings from the number keys, and the display control means displays a candidate character string group or word group transmitted from the disambiguation server on the display means in an order according to usage frequency information.

According to a character input system of a seventh aspect of the present invention, selection notification means for giving notification in the event that a candidate character string or candidate word has been selected is provided in the communication terminal, and database management means, for receiving notification from the selection notification means and increasing usage frequency information for the character string or word in the character string database, is provided in the disambiguation server.

According to a character input system of an eighth aspect of the present invention, in the event that operation using the multi-tap method has been carried out and a character string or word has been identified, the selection notification means gives notification of that character string or word, and the database management means receives notification from the selection notification means to update usage frequency information for the character string or word, or register or de-register the character string or word in the character string database.

According to a character input system of a ninth embodiment of the present invention, the display control means displays a space between character strings or words in the event that a plurality of character strings or words are displayed.

A communication terminal of a tenth aspect of the present invention, in a character input system provided with a disambiguation server, comprising a character string database storing candidate character strings or candidate words corresponding to key information strings from number keys, and means for searching the character string database based on a key information string arriving via the network to acquire candidate character strings or candidate words and returning these candidates to the communication terminal, and performing communication between the communication terminal and the disambiguation server, and transmitting and specifying character strings or words from the disambiguation server to the communication terminal in accordance with an operated key sequence in the communication terminal, comprises number keys from 0 to 9 respectively allocated to a plurality of characters, display means for displaying information, and display control means for displaying character strings or words transmitted from the disambiguation server on the display means.

BRIEF DESCRIPTION OF THE DRAWINGS

FIG. 4 is a drawing showing one example of stored contents of a character string database used in the character input system of the present invention.

FIG. 11 is a drawing showing one example of essential parts of stored contents of a character string database used in the character input system of the present invention.

DESCRIPTION OF THE PREFERRED EMBODIMENTS

Figure 1:
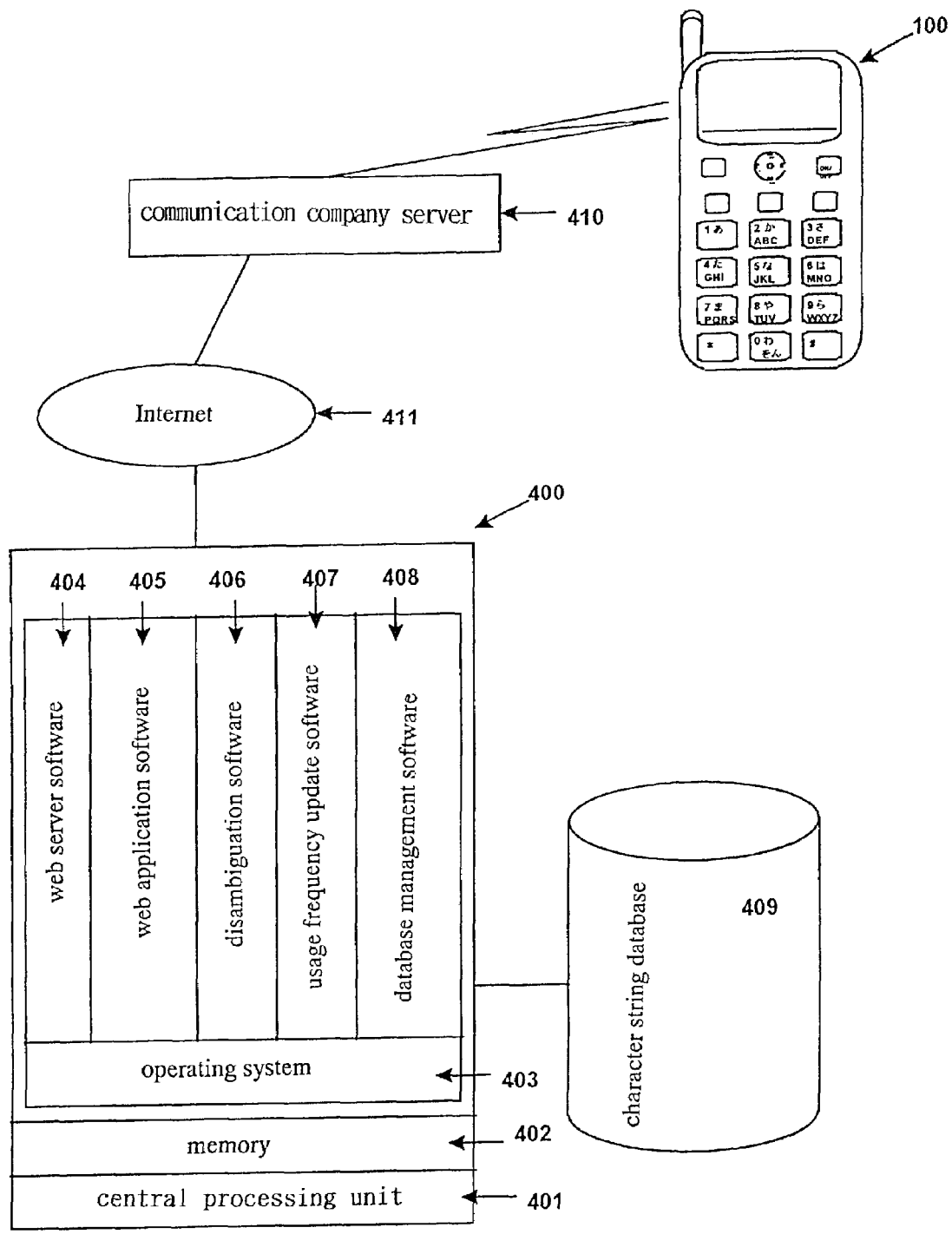
FIG. 1 is a schematic diagram of a character input system of the present invention.

A character input system of an embodiment of the present invention, and a communication terminal used in the character input system, will now be described with reference to the attached drawings. The same reference numerals are attached to the same structural elements throughout the drawings, and repeat description thereof is omitted. FIG. 1 shows a character input system of an embodiment of the present invention. This system adopts a mobile telephone 100, being a communication terminal of the embodiment of the present invention.

The character input system of this embodiment performs communication between the mobile telephone 100 and a disambiguation server 400 via a network including a communication company server 410 and the Internet 411, and transmits and specifies character strings corresponding to key strings executed on the mobile telephone 100 from the disambiguation server 400. A character string database 409 storing candidate character strings corresponding to key information strings from number keys is provided in the disambiguation server 400.

Figure 2:
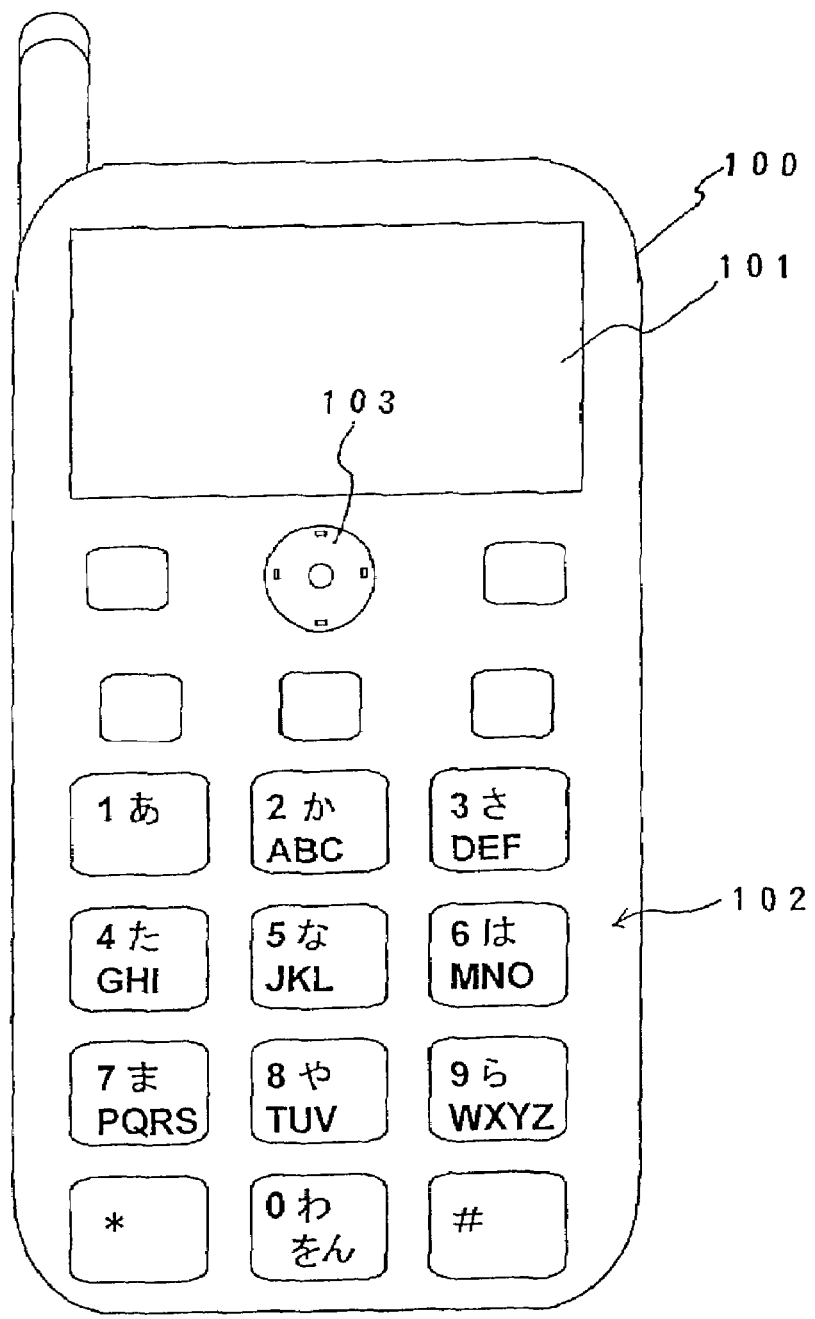
FIG. 2 is a front elevation of a mobile telephone, being a communication terminal of the present invention.

As shown in FIG. 2, the mobile telephone 100 has a user interface such as a display 101 and a keypad 102. A power supply button, a speaker, a microphone and various keys are provided on the mobile telephone 100. Reference numeral 103 is a cursor movement/selection key. Number keys allocated to numbers 0 to 9 are arranged on the keypad 102. With this embodiment, alphabetic characters are sequentially divided up into groups of three or four characters, and each group is assigned to a key, as with a standard miniature keypad. The letters A, B and C are allocated to the number key 2, the letters D, E and F are allocated to the number key 3, and so on. As well as the roman alphabet, characters of each country are allocated depending on the country of use, and giving the case of the present embodiment using Japanese as an example, hiragana characters are allocated. This embodiment uses the mobile telephone 100 as an example, but it is possible to adopt any communication terminal as long as it is a portable terminal having a plurality of characters allocated to each key as described above and provided with a function capable of communicating with a wired network or a wireless network.

Figure 3:
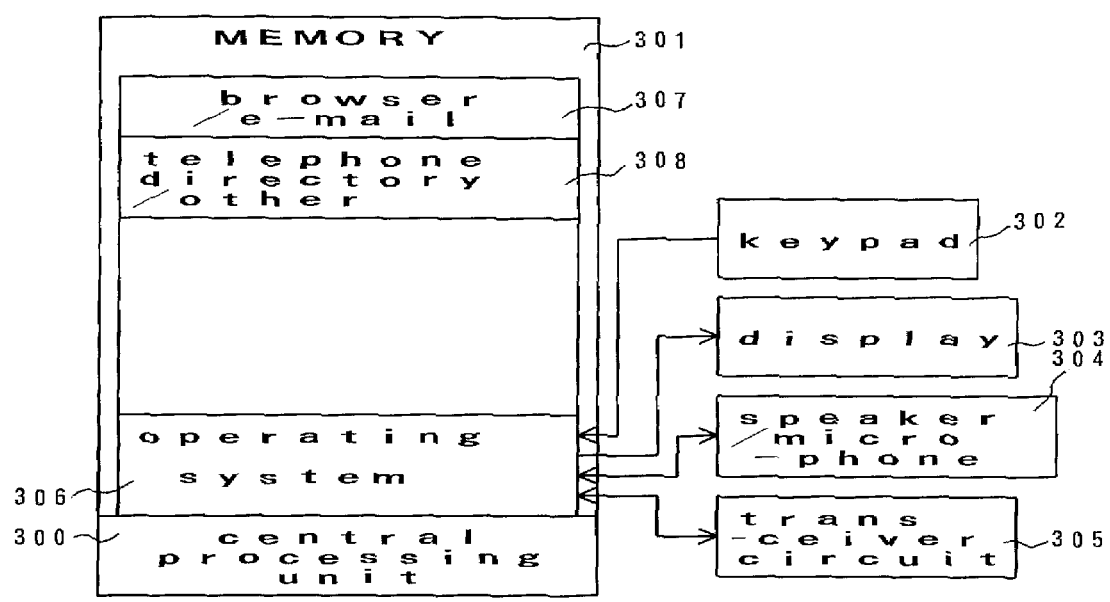
FIG. 3 is a schematic diagram of a mobile telephone, being a communication terminal of the present invention.

The system configuration of the mobile telephone 100 is shown in FIG. 3. The system is comprised of a central processing unit (CPU) 300, and peripheral devices such as a memory 301, keypad 302, display 303, speaker and microphone 304, and transceiver circuit 305. The CPU 300 reads programs and data from the memory 301 and executes instructions. The instructions are generated by software programs such as an operating system 306, browser or e-mail program 307, or a telephone directory or other program 208 being another application program.

As shown in FIG. 1, the disambiguation server 400 is provided with a CPU 401 and memory 402. An operating system 403, web server software 404, web application 405, disambiguation software 406, usage frequency update software 407 and database management software 408 are installed in the memory 402.

The web server software 404 mentioned above provides programs executed by a browser program of the browser/e-mail program 307 of the mobile telephone 100. The web application 405 is a program for executing required processing based on a request from the mobile telephone 100 and returning results. The disambiguation software 406 is software for performing disambiguation processing related to character input processing.

The character string database 409 has storage contents as shown, for example, in FIG. 4. That is, the character string database 409 is divided into a Japanese database, and English database and a URL database. This partitioning is for searching the character string database in partitioned search ranges according to processing content of an application program being executed in the mobile telephone 100. The character string database 409 stores candidate character strings and usage frequency corresponding to key information strings from number keys.

In a Japanese database section, for example, candidate character strings (a single character is also called a character string) and words from the Japanese syllabary group 'a', 'i', 'u' 'e' . . . are stored corresponding to key information "1". In an English database section, for example, candidate words 'RED', 'REF' 'SEE' . . . are stored corresponding to key information "733". In a URL database section, for example, candidate character strings 'YAHOO', 'WAGON' 'ZAINN' . . . are stored corresponding to key information "92466".

The usage frequency update software 407 provided in the disambiguation server 400 of FIG. 1 is software for updating usage frequency information of the character string database 409 based on notification from the mobile telephone 100. The database management software 408 is software for performing processing such as registration of new character strings in the character string database 409 based on notification from the mobile telephone 100. Because the disambiguation server 400 is comprised of a computer system, it is possible to allow registration of new URLs etc. in the character string database 409, and in this case the database management software 408 carries out processing.

Figure 6:
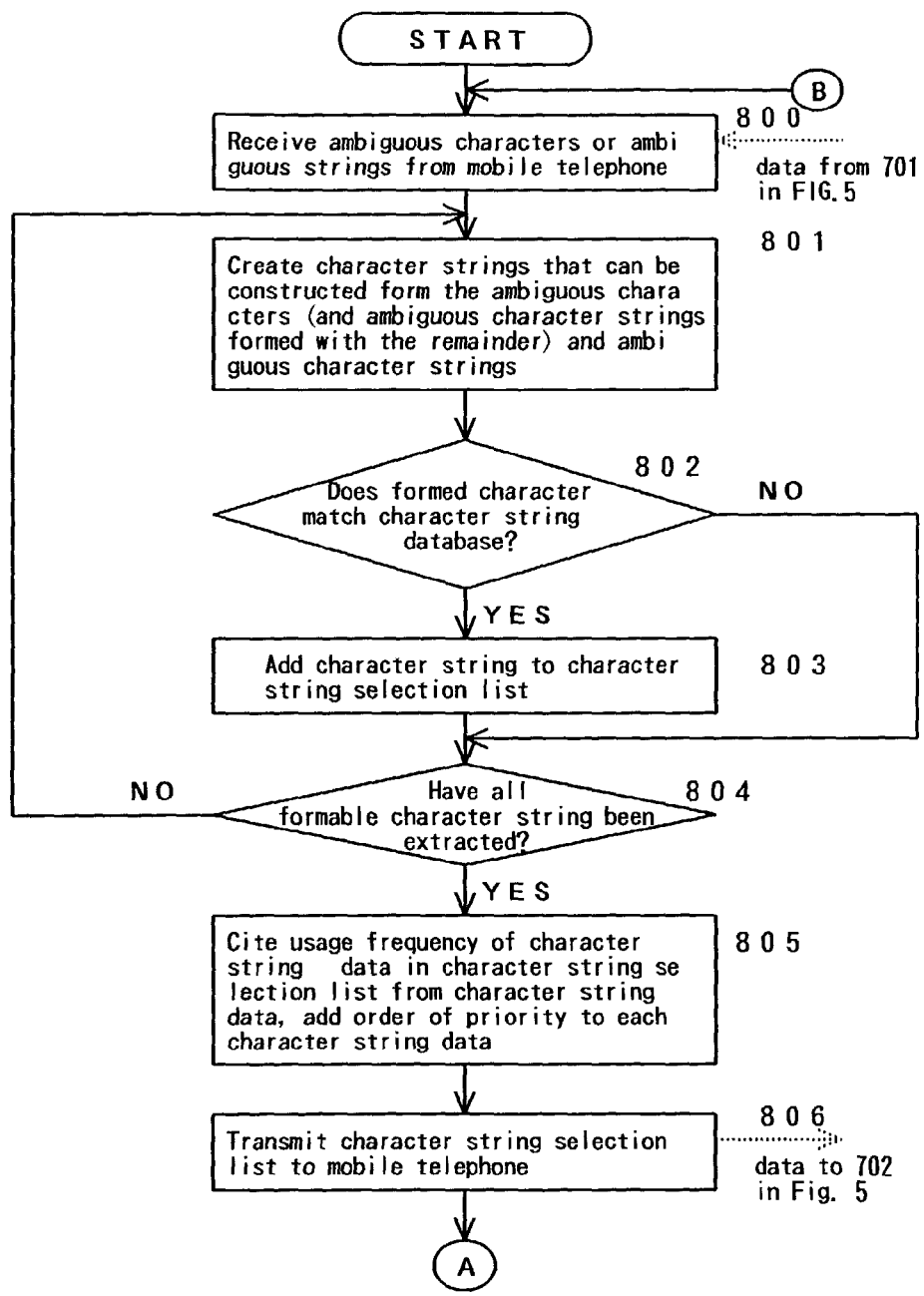
FIG. 6 is a flowchart for describing disambiguation server side operation of the character input system of the present invention.
Figure 7:
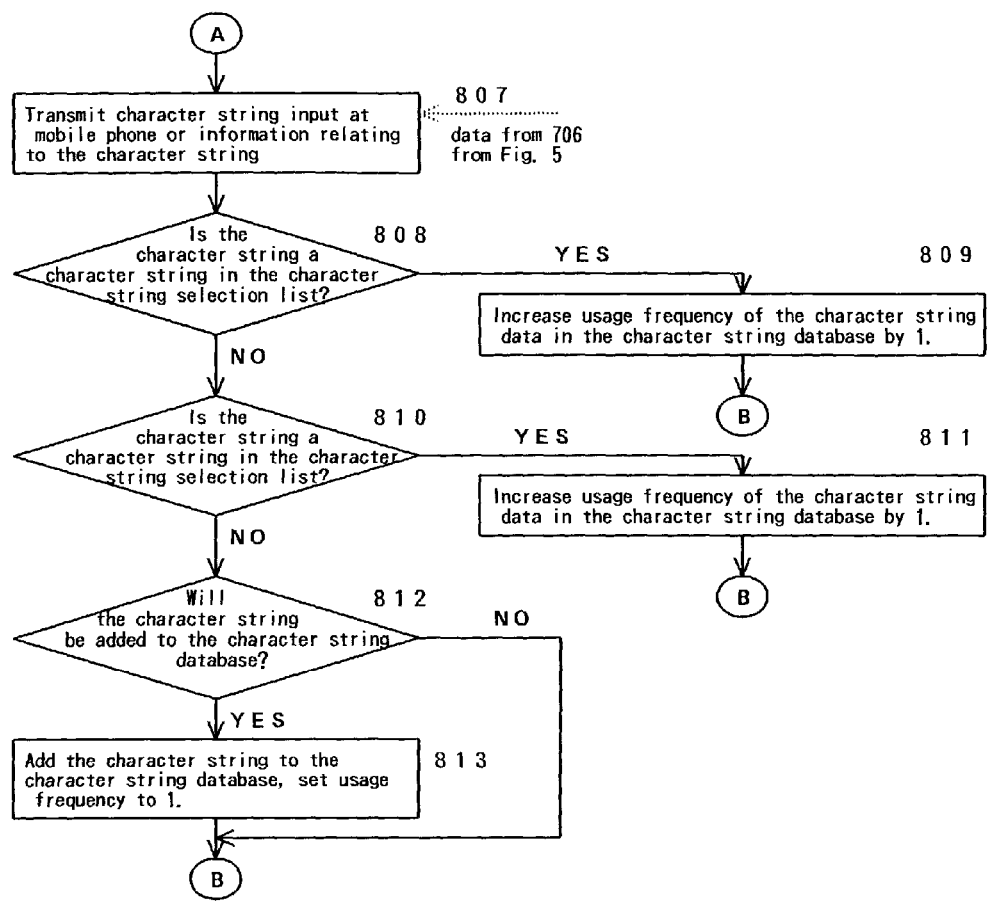
FIG. 7 is a flowchart for describing disambiguation server side operation of the character input system of the present invention.

In the character input system having the above described structure, the mobile telephone 100 operates as shown by the flow chart in FIG. 5, while the disambiguation server 400 operates according to the flowcharts shown in FIG. 6 and FIG. 7, and so a description of the operation will now be given based on these flowcharts. For example, if the browser of the browser/e-mail 307 is launched, display such as shown by reference numeral 500 in FIG. 8, for example, is carried out on the display 101, and processing advances to URL input. With this example, a URL can be input to the blank passages represented by x in www.xxx.com using ambiguous key input.

Here, a user of the mobile telephone 100 accesses a site 'YAHOO', and inputs each character of the character string 'YAHOO' desired to be input using the keypad 102 (700). Specifically, to input 'Y' the number key 9 to which 'Y' is allocated is actuated, the number key 2 to which 'A' is allocated is actuated to input 'A', the number key 4 to which 'H' is allocated is actuated to input 'H', the number key 6 to which 'O' is allocated is actuated to input 'O', and finally the number key 6 to which 'O' is allocated is actuated again to input the final 'O'.

In each character input step above, the software of the mobile telephone 100 displays an initial character 'w' allocated to the number key 9, 'a' allocated to the number key 2, 'g' allocated to the number key 4, 'm' allocated to the number key 6, and again 'm' allocated to the number key 6 on the display 101. In this stage, as shown clearly by reference numeral 501 in FIG. 8, 'wagmm' is then displayed on the display 101.

Figure 8:
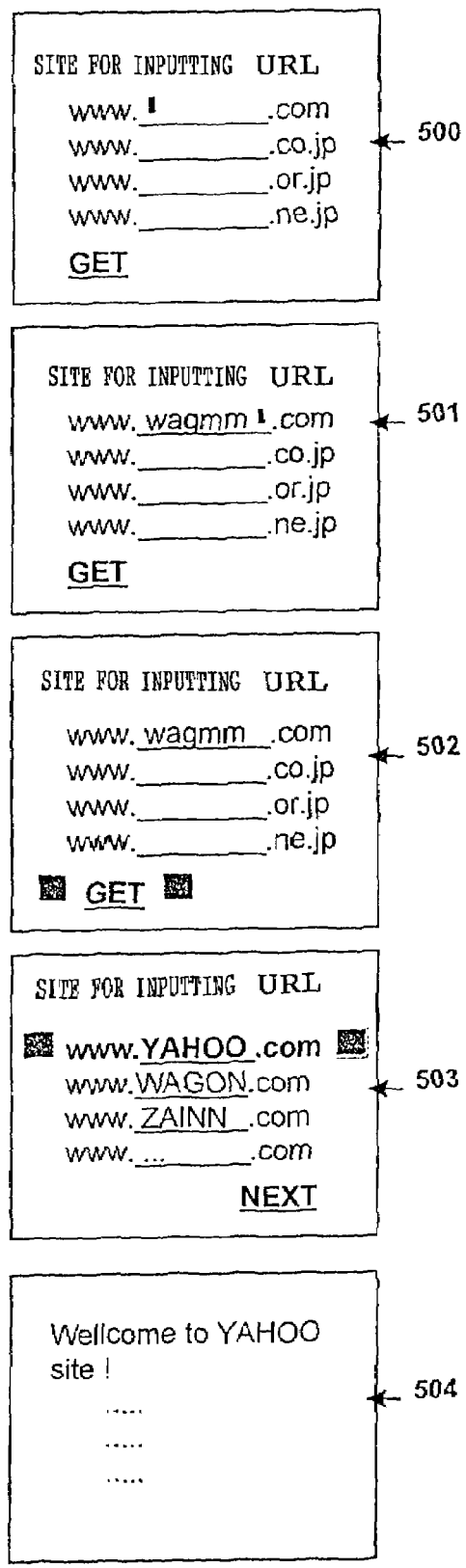
FIG. 8 is a drawing showing transition of display content of a mobile telephone in the case where URL input is carried out using the character input system of the present invention.

The user then confirms that the key that were operated to give 'wagmm' are respectively allocated to the characters for 'YAHOO', and then actuates the cursor movement/selection key 103 to position the cursor on 'GET' as shown by reference numeral 502 in FIG. 8, and carries out an operation to select 'GET'. As a result, the software of the mobile telephone 100 transmits application information (information specifying processing content of an application program in use) indicating that the character string is a URL, together with character string correspondence 'wagmm' to the disambiguation server 400 (701).

The disambiguation server 400 receives this information (800), searches the character string database 409 based on the received character string 'wagmm' (801) and detects the existence of registered character strings (802). At this time, a range for searching the character string database 409 is specified using the information indicating that the string is a URL.

If a character string is detected in step 802 above, it is added to a list to be returned to the mobile telephone 100 (803), and steps 801 to 804 are repeated until all character strings have been read in. If it is detected in step 804 that all character strings have been read out, an order of priority is appended to the character strings based on usage frequency of the character strings registered in the character string database 409 (805) and the character string list is returned to the mobile telephone 100 (806).

Figure 5:
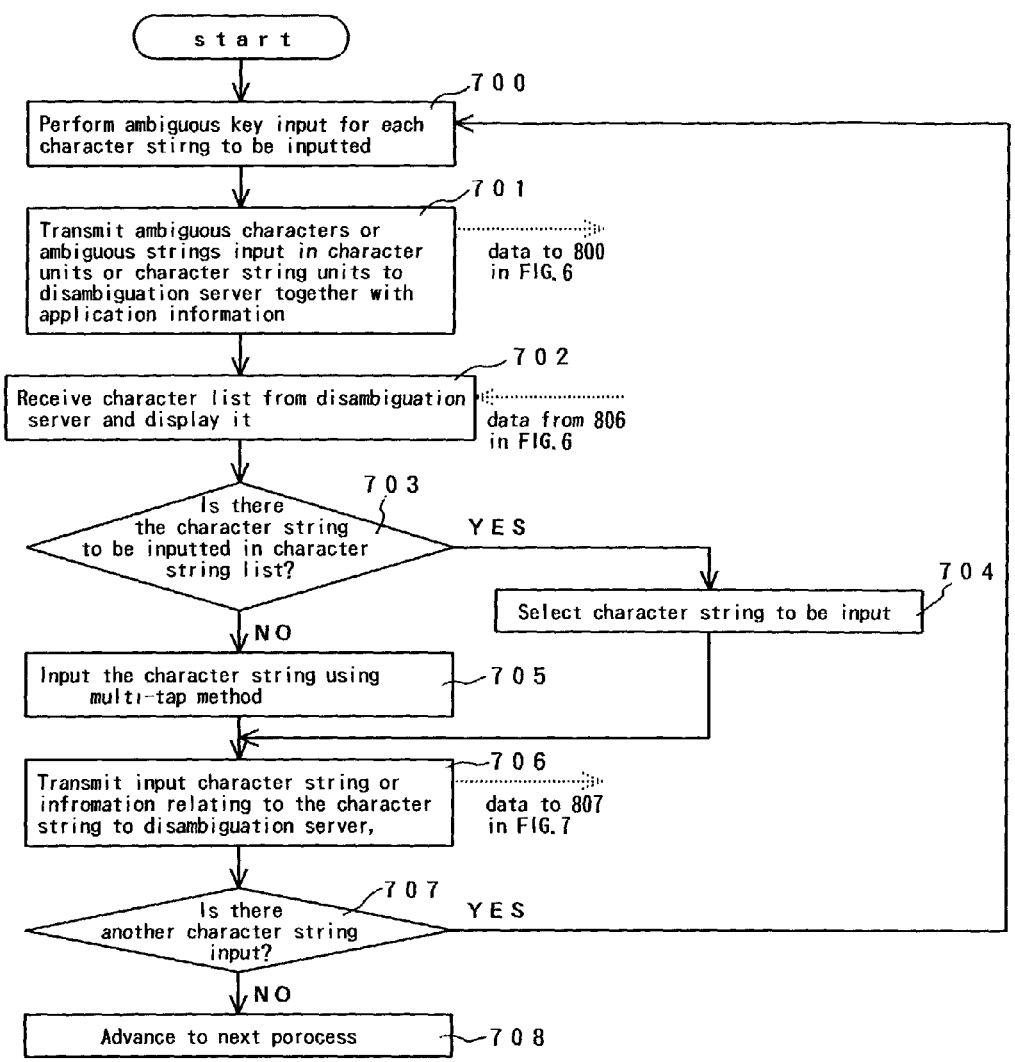
FIG. 5 is a flowchart for describing mobile telephone side operation of the character input system of the present invention.

The mobile telephone 100 receives the above mentioned list in step 702 shown in FIG. 5, and displays it as shown by reference numeral 503 in FIG. 8. At this time, display order is controlled by the order of priority. Whether or not a desired string is contained in the displayed candidate strings is determined by the user (703), and if not, it is possible to select and display other candidates by moving the cursor to a "NEXT" menu.

If a desired candidate is displayed, the cursor is moved to that character string ('YAHOO' in this case) to perform selection (704) and information relating to the selected character string is transmitted to the disambiguation server 400. At this time, in the mobile telephone 100 access to 'www.yahoo.com' is performed by the browser, and as is clear from reference numeral 504 in FIG. 8, the 'YAHOO' site is displayed.

Information relating to a selected character string transmitted in step 706 is received by the disambiguation server 400 (807), and it is detected whether or not it is a character string contained in the list initially returned to the mobile telephone 100. If it is detected in step 808 that a character string contained in the list initially returned to the mobile telephone 100 has been transmitted, the usage frequency update software 407 of the disambiguation server 400 increases the usage frequency of the character string registered in the character string database 409 by one.

In the character input of FIG. 8 above, a character string desired by the user was contained in the candidate character strings provided from the disambiguation server 400, but there may be cases where a desired character string is not contained. Assuming such a case, with this embodiment a structure permitting character input using a multi-tap method has been adopted.

That is, even if all candidate character strings are displayed in the list in step 703 in FIG. 5, in the event that a desired character string is not acquired the user carries out specified key input on the mobile telephone 100, transfers to a character input mode using a multi-tap method and inputs the desired character string (705). For example, if the character string 'TOKYO' is desired, 'TOKYO' is input using multi-tap character input, and the cursor movement/select key 103 is actuated to confirm this selection.

By doing this, information relating to the defined character string is transmitted to the disambiguation server 400 (706). At this time, in the mobile telephone 100 access to 'www.tokyo.com' is performed by the browser, and the 'TOKYO' site is displayed.

Information relating to a selected character string transmitted in step 706 (character string input using a multi-tap method) is received by the disambiguation server 400 (807), and it is detected whether or not it is a character string contained in the list initially returned to the mobile telephone 100 (808). It is detected in step 808 that a character string contained in the list initially returned to the mobile telephone 100 has been transmitted, and the database management software 408 of the disambiguation server 400 detects whether the transmitted character string is registered in the character string database 409 (810).

If it is detected in step 810 that the character string is registered, the usage frequency update software 407 of the disambiguation server 400 increases the usage frequency of the character string registered in the character string database 409 by one (811). On the other hand, if the character string is not registered, the database management software 408 detects whether or not to register the transmitted character string in the character string database 409 (812). At this time, for example, an announcement such as 'Do you want to register the new text 'TOKYO' in the text database?' is displayed on the display of the disambiguation server 400, a reply YES or NO is received and processing advances accordingly.

If a reply not to register the character string is detected in step 812 processing returns to awaiting receipt, but if a reply to register the character string is detected in step 812 then the database management software 408 registers the transmitted character string in the character string database 409 and sets the usage frequency for that character string to one (813).

In this way, since a character string that is not registered in the character string database 409 and for which no candidates are obtained from processing using the ambiguous key input can be acquired using the multi-tap method in the mobile telephone 100 and registered in the character string database 409, a candidate will be obtained the next time ambiguous key input is performed with that character string. In the example described above, with respect to whether or not the character string is registered in the character string database 409, a procedure for confirming with the operator each time this happens has been shown, but it is also possible, for example, set in advance whether or not the operator will register the character strings in the character string database 409.

Figure 9:
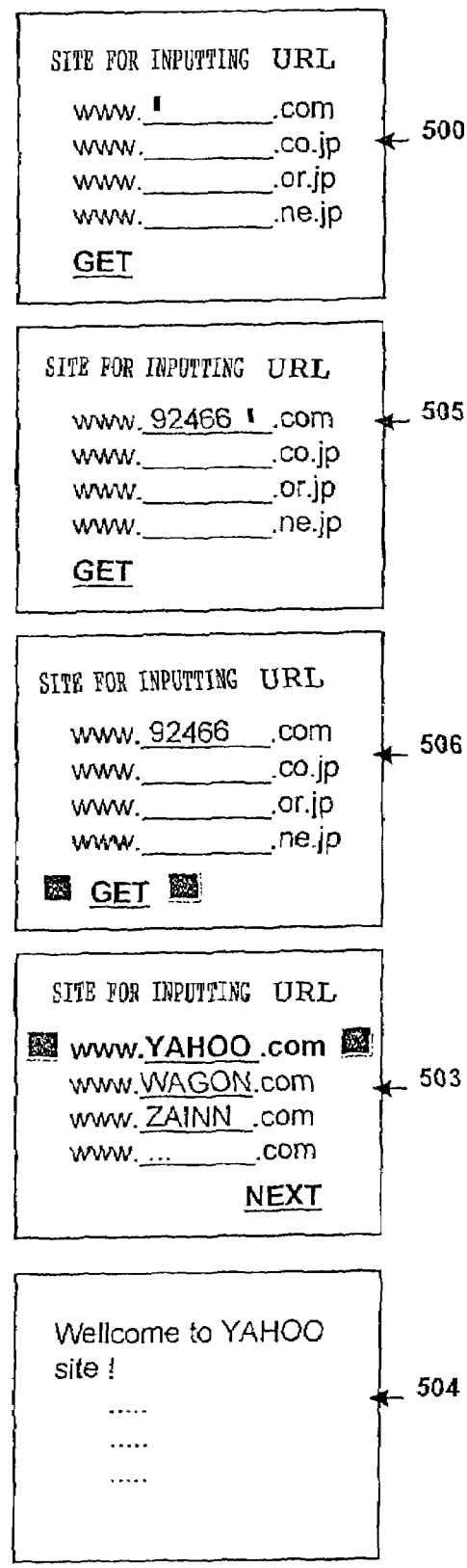
FIG. 9 is a drawing showing another example of transition of display content of a mobile telephone in the case where URL input is carried out using the character input system of the present invention.

In the embodiment described above, at each character input stage, as is clearly shown by reference numeral 501 in FIG. 8, the software of the mobile telephone 100 displays initial characters allocated to the operated number keys next to each other on the display, like 'wagmm', but it is also possible to display the number of the key that has been operated, as shown in FIG. 9.

With the structure described above, when performing character input in order to acquire 'YAHOO', the number keys 9, 2, 4, 6 and 6 again are pressed, and so the numbers 9, 2, 4, 6, 6 are shown on the display 101 in the order they were pressed. At the selection stage, as shown clearly by reference numeral 505 in FIG. 9, '92466' is displayed on the display 101. The remaining operation is the same as for the case of FIG. 8.

Next, another embodiment of an application using the present invention will be described. This application is using the character input system of the present invention for a chat site. An example will be given where this application is executed, and when the display shown, for example, by reference numeral 600 in FIG. 10 appears, a user named 'C' inputs 'good day' to the chat site. With the application of this example, a structure is adopted where each time a single character is input, that character is immediately transmitted to the disambiguation server 400. Specifically, from step 700 to step 702 in FIG. 5 is repeated as many times as there are characters in the character string to be input, and then processing advances to step 703.

Figure 10:
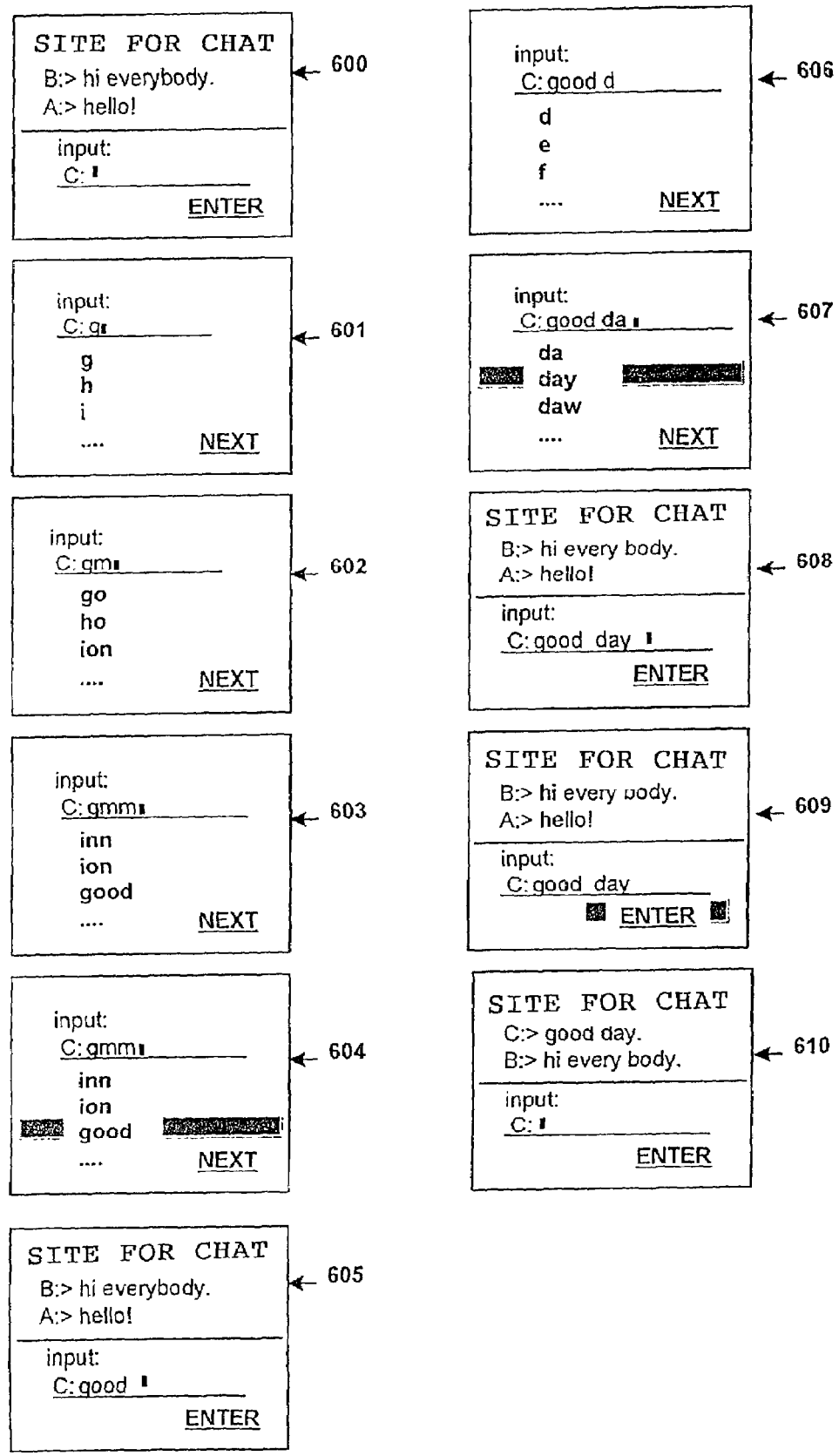
FIG. 10 is a drawing showing transition of display content of a mobile telephone in the case where English input is performed on a chat site, using the character input system of the present invention.
Figure 12:
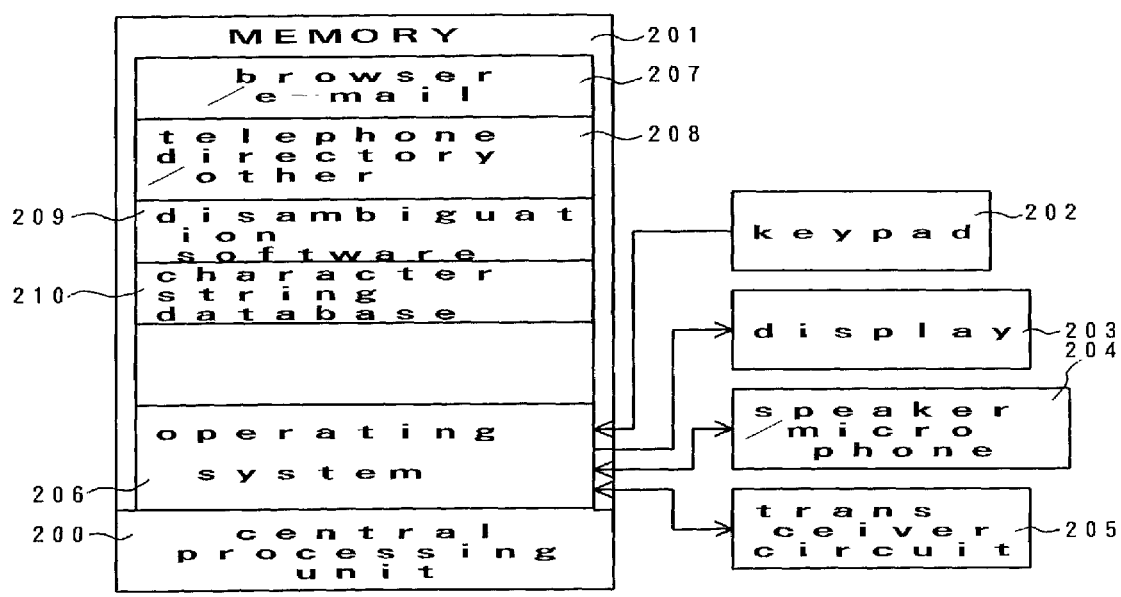
FIG. 12 is a system configuration drawing of a mobile telephone provided with a disambiguation system.

First, ambiguous key input will be performed for the first letter 'g' of the word 'good', as shown by reference numeral 601 in FIG. 10, so the number key 5 to which the letter 'g' is allocated is pressed. In response to this, the disambiguation server 400 executes steps 800 to 806 in the flowchart of FIG.

6, the character string 'g', 'h', 'i' etc. is returned to the mobile terminal and these letters are displayed as shown at 601 in FIG. 10.

Next, ambiguous key input for the letter 'o' will be performed, so the number key 6 to which the letter 'o' is allocated is pressed. In response to this, the disambiguation server 400 executes steps 800 to 806 in the flowchart of FIG. 6, candidate words 'go', 'ho', 'ion' etc. are returned to the mobile terminal and these words are displayed as shown at 602 in FIG. 10. With this embodiment the disambiguation server 400 returns candidate words starting with the input character strings. As a result, there are a lot of candidate words contained in a list to be returned which increases the communication load, but it is very convenient to be able to select a desired input word while all the letters of that word have still not been input.

As described in the following, ambiguous key input continues, and the point in time where the three character string 'gmm' has been input, the word to be input namely 'good', is displayed as shown at 603 in FIG. 10, and so the cursor is moved as shown by 604 to select the word 'good'. Similarly, continuing with input of the next word 'day', progressing through 605, 606 and 607 in FIG. 10 the word 'day' is eventually displayed, and at that time the cursor is moved as shown by 607 to select the word 'day', and input of the phrase 'good day' is completed (608). By selecting 'ENTER' using the cursor, as shown by 609 in FIG. 10, the character string 'good day' is displayed on the interactive screen of the chat site (610).

In the example above, in step 701 in FIG. 5, by transmitting application information indicating the application processing content (chat in English), disambiguation software in the disambiguation server 400 can acquire candidate character strings by searching only the English database section when searching the character string database 409. Also, in the event that a word is transmitted, a space is added and a space is inserted between two words, as shown by 608 in FIG. 10.

Description has been given above for using a URL database and an English database section inside the character string database 409, so now a description will be given of the Japanese database section. In the case of English character input, the only problem is to remove ambiguity from combinations of alphabetic characters, and with operation the number keys 7, 3, 3 it is possible to construct a dictionary using meaningful words from combinations of alphabetic characters allocated to these three keys. Specifically, it is possible to register words such as 'RED', 'SEE', 'RED' etc, in a database corresponding to the number keys 7,3,3, as shown in FIG. 11(*a*).

In the case of Japanese, there is still ambiguity even if the ambiguity of combinations of kana characters is removed. First of all, in the case of Japanese two alphabetic systems exist, namely hiragana and katakana. Japanese also has kanji characters. In FIG. 11(*b*), 'aka' (pronounced a-ka) is given as an example. Even if the ambiguity of the kana character combination 'a-ka' is removed, depending on the meaning and usage of the characters it may be a desired input a word such as 'aka' in the katakana notation, 'aka' in kanji notation meaning red or 'aka' in kanji notation meaning dirt. Accordingly, disambiguation software and a character string database for Japanese character input is constructed so as to include katakana and kanji to remove ambiguity. It is also possible to have a structure so as to remove ambiguity by providing a kanji conversion key or the like.

The above described structure enables the following effects. User ambiguous input is enabled even with a portable terminal that does not have a disambiguation system, and even in the case where it is necessary to frequently update a character string database used in a disambiguation system flexible handling is possible, which means that compared to a disambiguation system of the type installed in a conventional portable terminal the number of users and range of use can be increased.

Therefore: (1) It is made possible for a user of a portable terminal that does not have a disambiguation system built-in to also use ambiguous key input. (2) In the case of having disambiguation software or a character string database in a portable terminal, change or update of the disambiguation software or character string database is difficult from a practical point of view. With the present invention, the disambiguation software and character string database are all provided at the disambiguation server side, which means that even if the need to change the disambiguation software arises or it is necessary to frequently update the character string database, this can be handled in a flexible manner. (3) When having disambiguation software or a character string database in a portable terminal, since the memory capacity provided in the portable terminal is generally small, the functions of the disambiguation software and the size of the character string database are obviously limited, but with the present invention this is all provided at the disambiguation server side and so there is absolutely no problem in increasing the memory capacity as required. Users can therefore make optimum use of the disambiguation software or various character string databases, depending on the purpose of use. (4) When providing a character string database in a portable terminal, usage frequency of character string data in the character string database must be set beforehand, but with the present invention usage frequency data can be collected from a large number of users who use the disambiguation server, which means that there is increased usefulness as well as an improvement in accuracy of usage frequency data. (5) With the present invention, it is estimated that the large number of users who use the disambiguation server will increase the amount of character string data in the character string database, thus facilitating overall enhancement of the data in the character string database.

According to the present invention as described above, communication is carried out between a communication terminal and a disambiguation server via a network, so that character strings or words are transmitted and specified from the disambiguation server to the communication terminal in accordance with a key sequence performed at the communication terminal, while a character string database storing candidate character strings and candidate words corresponding to a key information string from number keys and means for searching the character string database based on key information strings arriving via the network to acquire candidate character strings and candidate words for return to the communication terminal are provided in the disambiguation server, which means that while adopting an ambiguous key character input method, appropriate character input is enabled without enlarging or complicating the structure of the portable terminal. It is also made possible to handle cases where it is necessary to update the character string database daily in a comparatively simple manner.

What is claimed is:

1. A character input system, performing communication via a network, comprising:
   a communication terminal having:
   number keys from 0 to 9 respectively allocated to a plurality of characters;
   a display means for displaying information;
   a display control means for displaying a character string or word;

a plurality of application programs including a browser/e-mail program; and a transmission means for transmitting information; and a disambiguation server having:

a character string database that stores candidate character strings or candidate words corresponding to strings of information from said communication terminal;

web server software providing programs executed by a browser or email program running on said communication terminal;

web application software for executing processing based on a request from said communication terminal and returning results to said communication terminal; and disambiguation software for performing disambiguation of character inputs by searching the character string database based on character strings arriving via the network, and acquiring and returning candidate character strings or candidate words to said communication terminal;

wherein:

the communication terminal transmission means transmits, to the disambiguation server:

content specifying the application program currently in use;

information about the processing of the application program currently in use; and information about the operation of the number keys, the information being transmitted immediately after any of the number keys 0 to 9 are operated individually;

the character string database is partitioned into search ranges corresponding to the application programs;

the disambiguation software searches the character string database according to the partitioned range;

the disambiguation server transmits candidate character strings or candidate words to the communication terminal;

the communication terminal displays said candidate character strings or candidate words on the display means;

the browser/e-mail program displays a URL on the display means, the URL comprising a blank area, the blank area displaying the candidate character strings or candidate words as the number keys are operated, the blank area being preceded by a prefix displayed before the number keys are operated, the prefix comprising one or more characters;

the candidate character strings or candidate words are displayed in the blank area of the URL; and the candidate character strings or candidate words begin with characters corresponding to the transmitted information about the operation of the number keys.

2. The character input system according to claim 1, wherein the character string database contains a search range of URLs.

3. The character input system according to claim 2, wherein the search range of URLs is used when a browser application is running on the communication terminal.

4. The character input system according to claim 1, wherein the character inputs are in a first notation, and the candidate character strings or words are returned with at least one symbol in a second notation, the symbol indicating a possible meaning of the candidate character string or word.

5. The character input system according to claim 4, wherein the first notation is hiragana or katakana notation, and the second notation is kanji notation.

6. The character input system according to claim 1, wherein the blank area is followed by a suffix that is displayed before the number keys are operated, the suffix comprising one or more characters.

7. A character input system, performing communication via a network, comprising:

a communication terminal having:

number keys from 0 to 9 respectively allocated to a plurality of characters;

a display means for displaying information;

a display control means for displaying a character string or word;

a plurality of application programs including a browser/e-mail program; and a transmission means for transmitting information; and a disambiguation server having:

a character string database that stores candidate character strings or candidate words corresponding to strings of information from said communication terminal;

web server software providing programs executed by a browser or email program running on said communication terminal;

web application software for executing processing based on a request from said communication terminal and returning results to said communication terminal; and disambiguation software for performing disambiguation of character inputs by searching the character string database based on character strings arriving via the network, and acquiring and returning candidate character strings or candidate words to said communication terminal;

wherein:

the communication terminal transmission means transmits, to the disambiguation server:

content specifying the application program currently in use;

information about the processing of the application program currently in use; and information about the operation of the number keys, the information being transmitted immediately after any of the number keys 0 to 9 are operated individually;

the character string database is partitioned into search ranges corresponding to the application programs;

the disambiguation software searches the character string database according to the partitioned range;

the disambiguation server transmits candidate character strings or candidate words to the communication terminal;

the communication terminal executes a multi-tap method to sequentially display, on the display means, one character among a plurality of characters allocated to the number key according to the number of times the key is operated;

the browser/e-mail program displays a URL on the display means, the URL comprising a blank area, the blank area displaying the candidate character strings or candidate words as the number keys are operated, the blank area being preceded by a prefix displayed before the number keys are operated, the prefix comprising one or more characters;

the candidate character strings or candidate words are displayed in the blank area of the URL; and the candidate character strings or candidate words begin with characters corresponding to the transmitted information about the operation of the number keys.

8. The character input system of claim 7 wherein:
the disambiguation server includes database management software,
the communication terminal has a selection notification means for giving notification to the disambiguation server in the event that a candidate character string or candidate word has been selected,
in the event that operation using the multi-tap method has been carried out and a character string or word has been selected, the selection notification means gives notification of the selected character string or word, and,
the display means displays a reguest whether to register the selected character string or word in character string database.

9. The character input system according to claim 7, wherein the character string database contains a search range of URLs.

10. The character input system according to claim 9, wherein the search range of URLs is used when a browser application is running on the communication terminal.

11. The character input system according to claim 7, wherein the character inputs are in a first notation, and the candidate character strings or words are returned with at least one symbol in a second notation, the symbol indicating a possible meaning of the candidate string or word.

12. The character input system according to claim 11, wherein the first notation is hiragana or katakana notation, and the second notation is kanji notation.

13. A communication terminal comprising:
number keys from 0 to 9 respectively allocated to a plurality of characters;
a display means for displaying information;
a display control means for displaying a character string or word;
a plurality of application programs including a browser/e-mail program; and
a transmission means for transmitting information;
wherein:
the transmission means communicates with a disambiguation server having:
a character string database that stores candidate character strings or candidate words corresponding to strings of information from said communication terminal;
web server software providing programs executed by a browser or email program running on said communication terminal;
web application software for executing processing based on a request from said communication terminal and returning results to said communication terminal; and
disambiguation software for performing disambiguation of character inputs by searching the character string database based on character strings arriving via the network, and acquiring and returning candidate character strings or candidate words to said communication terminal;
the communication terminal transmission means transmits, to the disambiguation server:
content specifying the application program currently in use;
information about the processing of the application program currently in use; and
information about the operation of the number keys, the information being transmitted immediately after any of the number keys 0 to 9 are operated individually;
the character string database is partitioned into search ranges corresponding to the application programs;
the disambiguation software searches the character string database according to the partitioned range;
the disambiguation server transmits candidate character strings or candidate words to the communication terminal; and
the communication terminal displays said candidate character strings or candidate words on the display means;
the browser/e-mail program displays a URL on the display means, the URL comprising a blank area, the blank area displaying the candidate character strings or candidate words as the number keys are operated, the blank area being preceded by a prefix displayed before the number keys are operated, the prefix comprising one or more characters;
the candidate character strings or candidate words are displayed in the blank area of the URL; and
the candidate character strings or candidate words begin with characters corresponding to the transmitted information about the operation of the number keys.

14. The communication terminal according to claim 13, wherein the character string database contains a search range of URLs.

15. The communication terminal according to claim 14, wherein the search range of URLs is used when a browser application is running on the communication terminal.

16. The character input system according to claim 15, wherein the character inputs are in a first notation, and the candidate character strings or words are returned with at least one symbol in a second notation, the symbol indicating a possible meaning of the candidate string or word.

17. The character input system according to claim 16, wherein the first notation is hiragana or katakana notation, and the second notation is kanji notation.

* * * * *

UNITED STATES PATENT AND TRADEMARK OFFICE
CERTIFICATE OF CORRECTION

| | |
|---|---|
| PATENT NO. | : 7,395,512 B2 |
| APPLICATION NO. | : 10/178514 |
| DATED | : July 1, 2008 |
| INVENTOR(S) | : Makabe et al. |

Page 1 of 1

It is certified that error appears in the above-identified patent and that said Letters Patent is hereby corrected as shown below:

Title page, item (57), in the Abstract, line 6, change "am" to --an--.

Claim 16, column 14, line 42, change "15" to --13--.

Signed and Sealed this

Sixteenth Day of September, 2008

JON W. DUDAS
*Director of the United States Patent and Trademark Office*